United States Patent
Theiss

(10) Patent No.: US 12,448,144 B1
(45) Date of Patent: Oct. 21, 2025

(54) MULTI-MOTOR DRIVE UNIT

(71) Applicant: Shawn M. Theiss, North Benton, OH (US)

(72) Inventor: Shawn M. Theiss, North Benton, OH (US)

(*) Notice: Subject to any disclaimer, the term of this patent is extended or adjusted under 35 U.S.C. 154(b) by 714 days.

(21) Appl. No.: 17/691,497

(22) Filed: Mar. 10, 2022

Related U.S. Application Data

(60) Provisional application No. 63/159,061, filed on Mar. 10, 2021.

(51) Int. Cl.
  *B64D 35/08* (2025.01)
  *B64D 35/021* (2024.01)
(52) U.S. Cl.
  CPC ............ *B64D 35/08* (2013.01); *B64D 35/021* (2024.01); *B60L 2240/421* (2013.01)
(58) Field of Classification Search
  CPC .. B64D 35/08; B64D 35/021; B60L 2240/421
  USPC .......................................................... 74/661
  See application file for complete search history.

(56) References Cited

U.S. PATENT DOCUMENTS

| | | | | |
|---|---|---|---|---|
| 1,466,394 A | * | 8/1923 | Fornaca | B64D 35/08 244/53 A |
| 2,180,599 A | * | 11/1939 | Menasco | B64D 35/08 74/661 |
| 2,893,495 A | * | 7/1959 | McDowall | B64D 35/00 74/661 |
| 4,161,240 A | * | 7/1979 | Pringle | F16D 65/60 188/79.55 |
| 11,492,130 B2 | * | 11/2022 | Hirabayashi | B64D 27/24 |

* cited by examiner

*Primary Examiner* — William C Joyce
(74) *Attorney, Agent, or Firm* — Fred Zollinger

(57) ABSTRACT

Drive systems use multiple motors that work together to reduce the propulsion system weight while not sacrificing horsepower while also providing redundancies for safety. The drive systems can be used to power an aircraft. An advantage in the use of multiple smaller, lighter motors in a drive system is that the propulsion system has redundant safety. Should one motor in the propulsion system fail during operation, the other motor or motors will continue to produce thrust to enable the aircraft to continue flight or land safely, as opposed to a forced, no power landing due to a complete motor loss when using one motor.

11 Claims, 4 Drawing Sheets

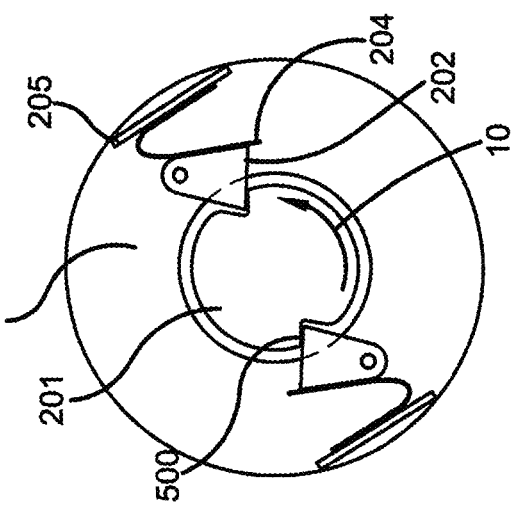
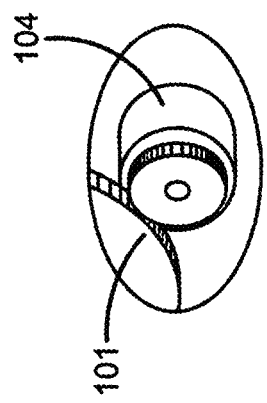
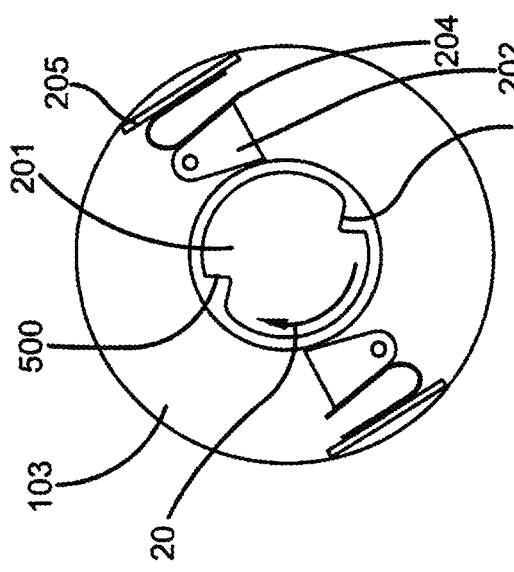
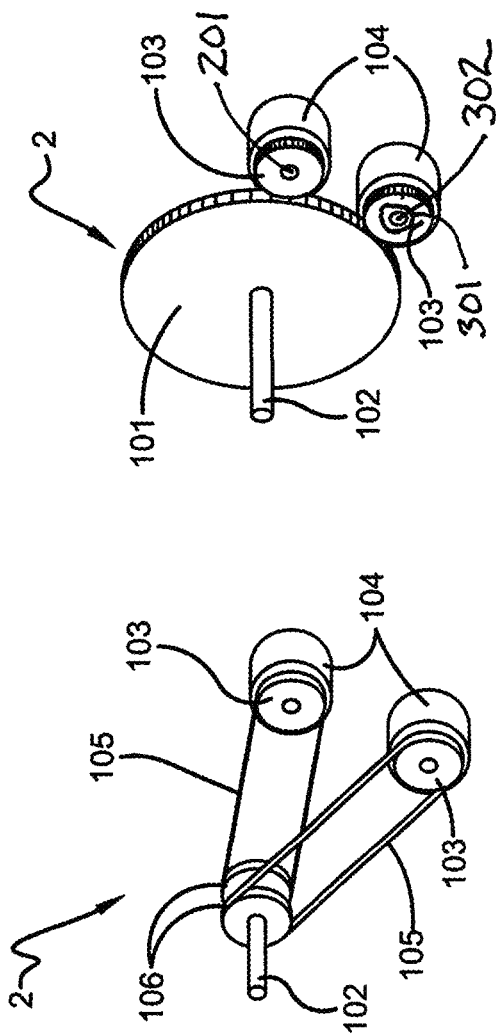
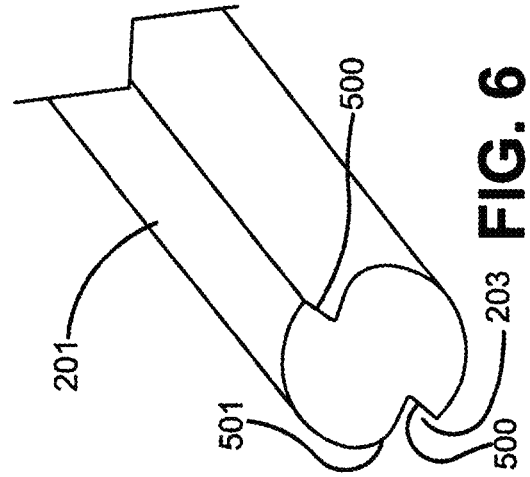

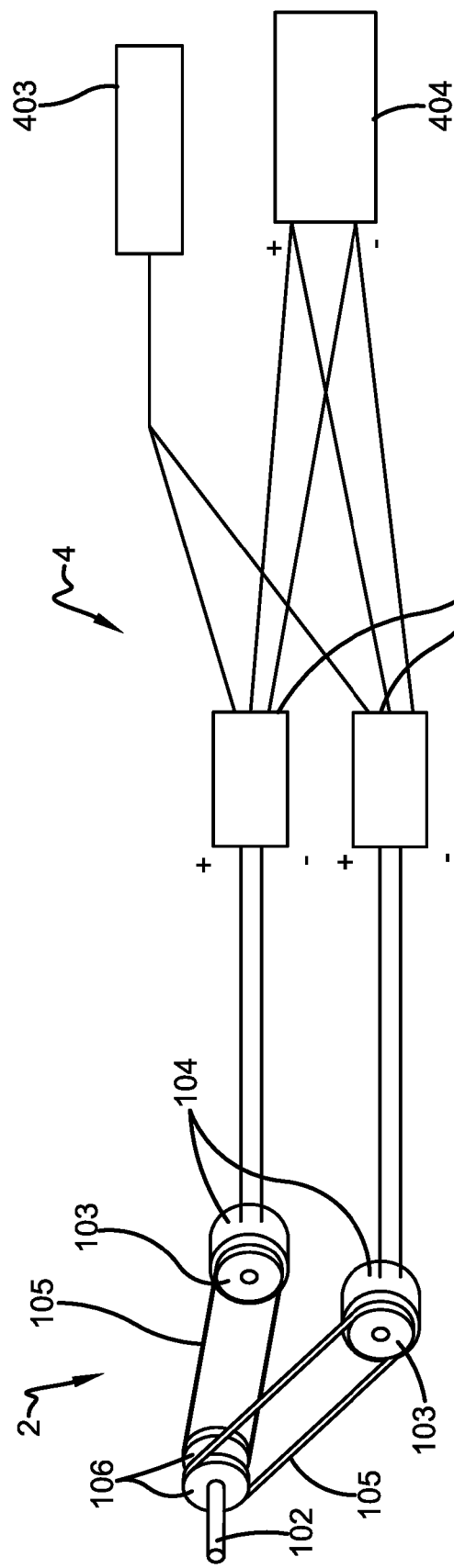
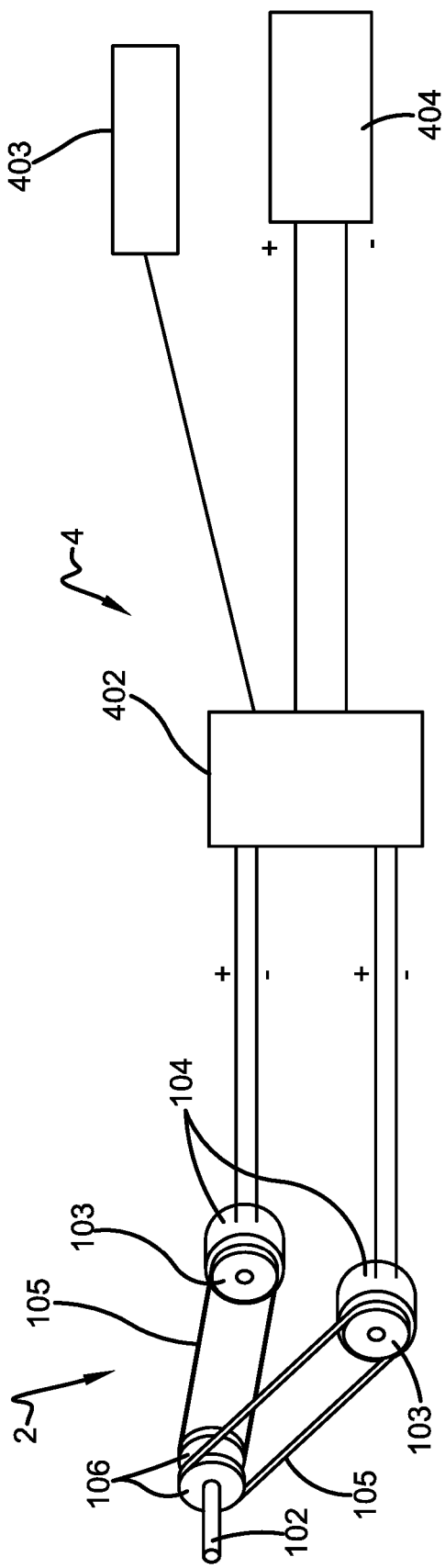

MULTI-MOTOR DRIVE UNIT

CROSS REFERENCE TO RELATED APPLICATIONS

This application claims the benefit of U.S. Provisional Patent Application No. 63/159,061 filed 10 Mar. 2021; the disclosure of which are incorporated herein by reference.

BACKGROUND OF THE DISCLOSURE

1. Technical Field

The disclosure is related to drive systems that use multiple motors to power a single output shaft. More particularly, the disclosure relates to a drive system for an aircraft that includes a plurality of electric motors that drive a single output shaft.

2. Background Information

Current electric motor propulsion systems for aircraft rely on one electric motor, either direct drive or geared, to drive a propeller or fan for producing thrust. To increase horsepower, a single larger, heavier replacement electric motor must be used to replace the smaller motor. For example, one company, magniX, produces the Magni 250; a 160 lb. electric motor producing 375 horsepower (hp). That translates to 2.34 hp. per pound. Should the single motor fail or become unable to operate, thrust will be eliminated or reduced and powered flight will no longer be possible. Another company (Safran) produces the ENGINEeUS which is a 38 lb. electric motor producing 94 hp. That translates to 2.47 hp. per pound. Four of the Safran electric motors would total approximately 152 lbs., but produce 376 hp.

SUMMARY OF DISCLOSURE

The disclosure provides drive systems that use multiple motors that work together to reduce the propulsion system weight while not sacrificing horsepower while also providing redundancies for safety. An advantage in the use of multiple smaller, lighter motors in a drive system is that the propulsion system has redundant safety. Should one motor in the propulsion system fail during operation, the other motor or motors will continue to produce thrust to enable the aircraft to continue flight or land safely, as opposed to a forced, no power landing due to a complete motor loss when using one motor. In an exemplary aircraft with a single large 375 hp motor, should the one motor fail during flight, the propulsion system will not be able to provide continued thrust for the aircraft. But if the exemplary aircraft used four smaller 94 hp motors and one of them failed, the other three motors would continue to operate and produce approximately 282 hp of thrust to possibly allow continued flight of the aircraft, or at a minimum, decrease the rate of decent to allow a pilot more time to reach possible landing options.

The disclosure also provides a drive system that provides the ability to increase its horsepower by adding an additional motor or motors. In an exemplary aircraft using a single 375 hp motor, increasing the horsepower to around 450 hp requires the single 375 hp motor to be completely replaced with another larger electric motor. By using the multiple motor system of the disclosure, an additional 94 hp electric motor can be added to the propulsion system to provide 5 motors in total to produce 470 hp.

The disclosure provides an aircraft propulsion system using multiple smaller electrical motors of equal performance/horsepower to work together in one drive unit to drive a single driveshaft. If a larger aircraft requiring more horsepower is presented, then additional motors of equal performance/horsepower may be added to the one drive unit to increase horsepower.

The disclosure provides one exemplary drive system embodiment comprised of at least two electric motors (a drive unit) that share one electronic speed controller (ESC) to cause the motors to operate equally together ("slaved" together) to output the same horsepower at the same output shaft speed.

The disclosure provides another exemplary drive system embodiment comprised of at least two electric motors (a drive unit) that have separate electronic speed controllers (ESC) that share a signal or control input line to cause the motors to operate equally together ("slaved" together).

The disclosure provides an exemplary drive unit embodiment for an aircraft having at least two electric motors that drive one single driveshaft having a propeller or fan attached to it. In one configuration, the motors of the drive unit use drive wheels in the form of gear wheels to allow the output shafts of the electric motors to drive one single driveshaft. In another configuration, the motors of the drive unit use drive wheels in the form of friction wheels to allow the output shafts of the electric motors to drive one single driveshaft. In a further configuration, the motors of the drive unit use drive wheels with independent belts or chains to allow the output shafts of the electric motors to drive one single driveshaft. In still a further configuration, the motors of the drive unit use a common belt or chain such as a serpentine belt or chain between the electric motors output shafts and driveshaft to allow the output shafts of the electric motors to drive one single driveshaft.

The disclosure provides drive unit configurations designed to allow the single driveshaft (driving a propeller, or fan, or rotor) to continue operating should a motor fail by allowing the motor drive wheel on the failed motor to continue to rotate independent of the failed motor output shaft and not prevent the other motor or motors and their associated drive wheel or wheels from driving the single driveshaft.

In one configuration, each motor of the drive unit includes an electric motor output shaft with a drive wheel (geared wheel, friction wheel, belt wheel, or chain wheel) mounted to the output shaft in a manner that allows the drive wheel to continue rotating when the output shaft slows or stops rotating. In this configuration, the output shaft includes at least one locking channel and the drive wheel includes at least one locking peg that is resiliently forced into the output shaft locking channel by a spring or wire when the locking peg and shaft locking channel are aligned and the electric motor is operating. If the motor output shaft stops or slows, the locking peg is released and the drive wheel can continue to rotate faster about the motor output shaft by being driven by the other motor through its connection with the driveshaft wheel. The locking peg or pegs are forced out of the output shaft locking channel by sliding on a sloped side of the output shaft locking channel (similar to how a valve lift rides on a cam lobe in an engine) when the electric motor is not operating and its drive wheel continues to be rotated by the system.

In another configuration, each motor of the drive unit includes an electric motor output shaft with a drive wheel (geared wheel, friction wheel, belt wheel, or chain wheel) mounted to the output shaft in a manner that allows the drive wheel to continue rotating when the output shaft slows or stops rotating. In this configuration, a collar is connected to the output shaft and the collar includes at least one locking channel and the drive wheel includes at least one locking peg that is resiliently forced into the collar locking channel by a spring or wire when the locking peg and shaft locking channel are aligned and the electric motor is operating. If the motor output shaft stops or slows, the locking peg is released and the drive wheel can continue to rotate faster about the motor output shaft by being driven by the other motor through its connection with the driveshaft wheel. The locking peg or pegs are forced out of the collar locking channel by sliding on a sloped side of the collar locking channel (similar to how a valve lift rides on a cam lobe in an engine) when the electric motor is not operating and its drive wheel continues to be rotated by the system.

The individual features may be combined in different combinations than specifically described below to form different configurations of the device of the disclosure. The preceding non-limiting aspects of the disclosure, as well as others, are more particularly described below. A more complete understanding of the devices, assemblies, and methods can be obtained by reference to the accompanying drawings, which are not intended to indicate relative size and dimensions of the assemblies. In those drawings and the description below, like numeric designations refer to components of like function. Specific terms used in that description are intended to refer only to the particular structure of the embodiments selected for illustration in the drawings, and are not intended to define or limit the scope of the disclosure.

BRIEF DESCRIPTION OF THE DRAWINGS

FIG. 1 depicts one exemplary drive unit configuration that has two electric motors driving one driveshaft by using two belts or chains.

FIG. 2 depicts one exemplary drive unit configuration that has two electric motors driving one driveshaft by using two geared wheels or friction wheels.

FIG. 3 depicts an exemplary electric motor.

FIG. 4 depicts an electric motor output shaft with two locking channels and a drive wheel with two locking pegs in their engaged positions.

FIG. 5 depicts an electric motor output shaft with two locking channels and a drive wheel with two locking pegs in their disengaged positions.

FIG. 6 is a perspective view of an electric motor output shaft having two locking channels.

FIG. 9 shows one drive system comprised of at least two electric motors that have separate electronic speed controllers (ESC) that share a signal or control input line.

FIG. 10 shows one drive system comprised of at least two electric motors that share one electronic speed controller (ESC).

DETAILED DESCRIPTION OF THE DISCLOSURE

Figure 8:
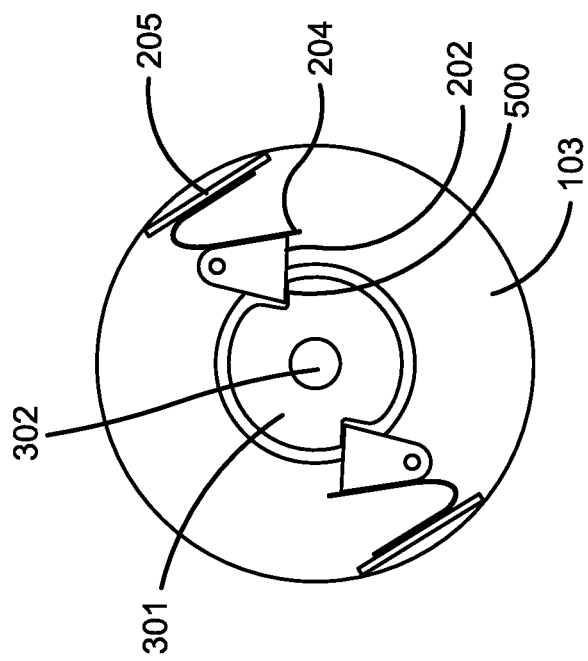
FIG. 8 depicts a collar fitting with two locking channels and a drive wheel with two locking pegs in their engaged positions.

Exemplary aircraft drive unit configurations are indicated generally by the numeral 2 in the accompanying drawings.

Each system 2 uses multiple motors 104 that work together to reduce the propulsion system weight while not sacrificing horsepower while also providing redundancies for safety. An advantage in the use of multiple smaller, lighter motors in drive systems 2 is that the propulsion systems has redundant safety. Should one motor 104 in propulsion system 2 fail during operation, the other motor 104 or motors 104 will continue to produce thrust to enable the aircraft to continue flight or land safely, as opposed to a forced, no power landing due to a complete motor loss when using one motor 104. Systems 4 that include a drive unit 2 are depicts in FIGS. 9 and 10 and include an electronic speed controller 402 and a power source 404. Although systems 4 are described as being used in the example of an aircraft such as a fixed wing aircraft, a helicopter or rotorcraft, ducted-fan, or ornithopter, system 4 or drive units 2 can be used in other applications without departing from the concepts described in this application.

Although the exemplary configurations show two motors 104, a higher number of motors 104 as needed for power and weight can be used in each of the configurations described in the text and drawings.

One embodiment has drive unit 2 with at least two electric motors 104 to drive the coupler wheel device 101 or 106 that is attached to a driveshaft 102. In the FIG. 1 configuration, coupler wheel device 106 has a coupler wheel 106 for each motor 104. In the FIG. 2 configuration, coupler wheel device 101 has a single coupler wheel 101 for all the motors. Either configuration can be used with all of the drive options. Each coupler wheel 106 functions with belt or chain 105. Each coupler wheel 101 includes gear teeth or a friction drive surface that is driven by a frictional connection such as a drive wheel. Couple wheel device 101 or 106 can thus include a single coupler wheel or a plurality of coupler wheels. Coupler wheel device is directed or indirectly connected to output driveshaft 102 to transfer rotational power from the coupler wheel device to the output driveshaft. Output driveshaft 102 is directly or indirectly connected to the mechanism that powers the assembly with which drive unit 2 is being used. For example, output driveshaft 102 can be connected to the propeller of an aircraft.

Electric motors 104 within one drive unit 2 are of equal performance/horsepower. Motors 104 have the same performance characteristics so that they can be operated to drive driveshaft 102 together. Motors 104 thus have the same output speed and output horsepower in response to the same electric input power. Electric motors 104 within the one drive unit are electronically slaved together to allow motors 104 to match the performance of one another so that they work together. Electric motors 104 within one drive unit 2 may be electronically slaved together by sharing one electronic speed controller (ESC) 402 and one signal or control input line 403 as shown in FIG. 10. Electric motors 104 within the one drive unit may be electronically slaved together by having separate electronic speed controllers (ESC) 401 that share a signal or control input line 403 as shown in FIG. 9. One or more power sources 404 such as a battery or batteries or other sources of electric power are used to supply electric power to controller 402 and motors 104.

As described above, electric motors 104 within drive unit 2 drive coupler wheel device which has one or more coupler wheels 101 or 106. Coupler wheels 101 or 106 are directly or indirectly connected to driveshaft 102 and can be separate from each (coupler wheels functioning together but not connected together other than by being connected to driveshaft 102) other or connected together (a single couple wheel device with multiple wheel portions). Each coupler wheel 101 or 106 may be sized to be smaller than, equal to, or larger than the diameter of the drive wheels 103 of electric motors 104. Each drive wheel 103 is configured to cooperate with its coupler wheel 101 or 106 and is thus configuration to work with a belt or chain, a geared or friction connection. The geared and friction connections between drive wheels 103 and coupler wheels 101 use direct connections between the elements or connections with intermediate gears or rollers. The belt or chain connections between drive wheels 103 and coupler wheels 106 use indirect connections formed by belts 105 or chains 105 between the elements or connections with intermediate belts or chains. The belt or chain 105 may be configured to have one belt/chain 105 per electric motor or may use one belt/chain 105 between all electric motors 104 (i.e.: serpentine type configuration) to drive the single driveshaft 102.

Each electric motor 104 has an output shaft 201 defining at least one locking channel 203. The exemplary configuration depict motor output shaft 201 defining two locking channels 203. In the alternative exemplary configuration of FIGS. 7 and 8, locking channels 203 are defined by a collar 301 that is connected to motor output shaft 201. Both configurations operate in a similar manner.

Drive wheel 103 is driven by electric motor output shaft 201 or, if shaft 201 stops or slows below the speed of driveshaft 102, drive wheel 103 rotates or spins around electric motor output shaft 201. Shaft 201 could stop or slow if its motor 104 fails such as a mechanical failure or a loss of power. If another motor 104 continues to operate and rotate driveshaft 102, then the failed motor 104 must release and allow the other motor or motors 104 of unit 2 to continue to power driveshaft 102. As such, drive wheel 103 is designed to lock in an engaged condition as shown in FIG. 4 with electric motor output shaft 201 when motor output shaft spins at its normal speed of drive unit 2 motors 104 in one direction 10 which is the common speed of both shaft 201 and drive wheel 103. Drive wheel is also designed to unlock to a disengaged condition as shown in FIG. 5 when the motor output shaft 201 stops spinning or slows below the speed 10 of the other motor or motors 104 of unit 2. Drive wheel 102 then ratchets about shaft 201 with arrow 20 depicting the relative rotation between shaft 210 and drive wheel 103. Drive wheel 103 continues to rotate because it is driven by the other motor 104 or motors 104 of drive unit 2 that are powering driveshaft 102. The disengaged condition of drive wheel 103 provides little drag on unit 2.

Figure 7:
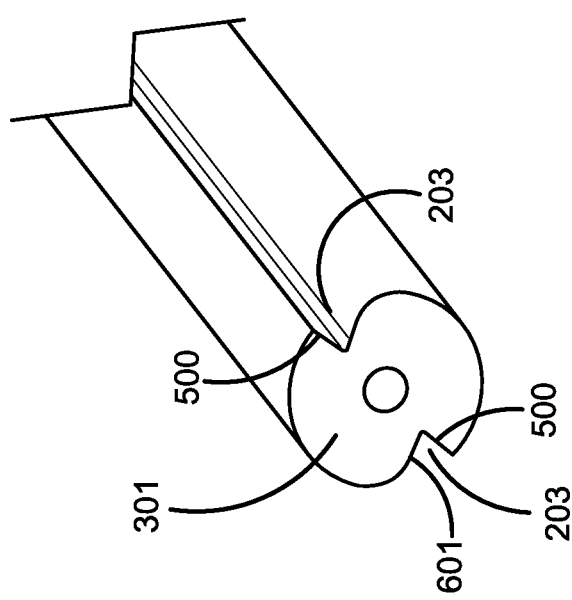
FIG. 7 is a perspective of a collar fitting having two locking channels.
Figure 11:
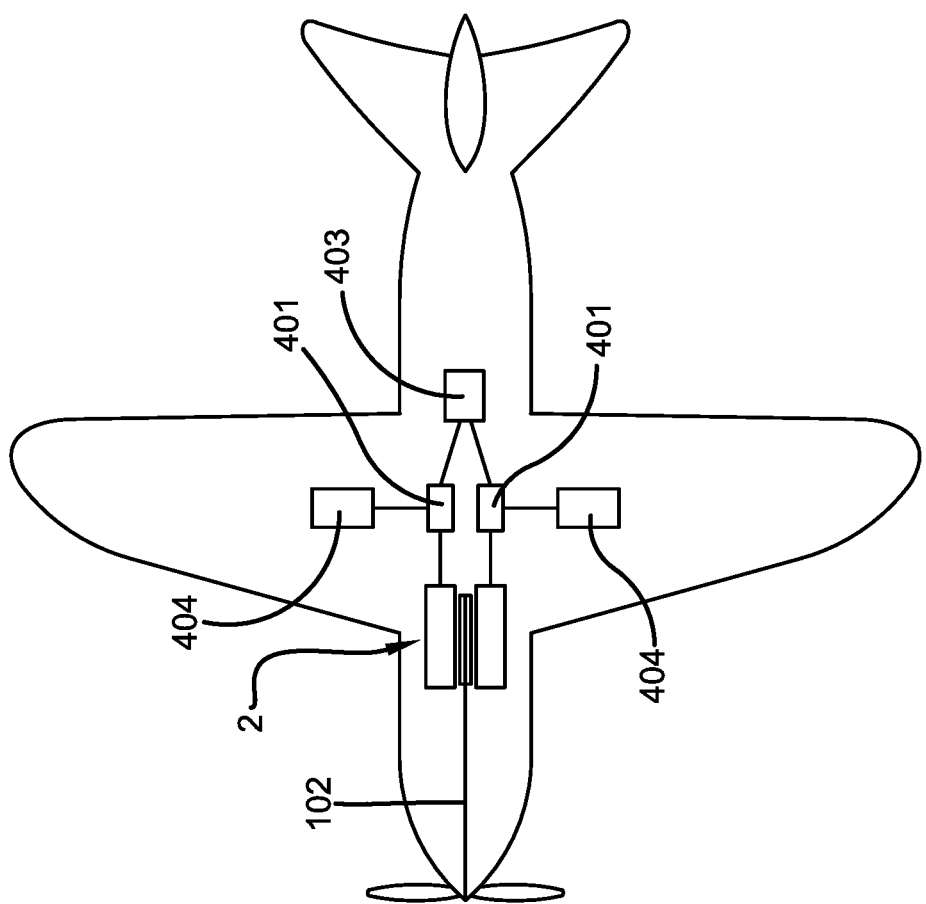
FIG. 11 is a schematic of an exemplary drive system used with a fixed wing aircraft.

As noted above, electric motor output shaft 302 may have mounted to it a collar 301 fitting as shown in FIGS. 7 and 8. Collar 301 defines at least one locking channel 203 and has a hole or other device to receive electric motor output shaft 302 in a manner that fix collar 301 to shaft 302. Collar 301 is affixed to electric motor output shaft 302 to prevent the collar 301 from being able to rotate or spin around the output shaft 302. Drive wheel 103 is driven by collar 301 when drive wheel 103 is in the engaged condition. Drive wheel 103 ratchets around collar 301 when drive wheel 103 is in the disengaged condition.

Drive wheel 103 includes at least one locking peg 202 with at least one resilient member 204 such as a spring or a bent wire that applies force to locking peg 202 to force it into locking channel 203 against a locking surface 500 when peg 202 is aligned with channel 203. The exemplary configurations depict two locking pegs 202 but other numbers of pegs 202 can be used. Pegs 202 can have a variety of shapes and can slide, pivot, or rotate between their engaged and disengaged positions. Wedge shaped, pivoting pegs 202 are depicted as examples in the drawings. Each locking peg 202 is movable between an engaged position and a disengaged position. The engaged position of locking pegs 202 places drive wheel 103 in its engaged condition and the disengaged position of locking pegs 202 places drive wheel 103 in its disengaged position. Resilient member 204 is held in place or mounted to a mount 205 so as to always apply force to locking peg 202 to force it inwardly toward locking channel 203 when the two are aligned. Resilient member 204 is designed and mounted in such a way to force locking peg 202 into the locking channel 203 and to help hold locking peg 202 in its engaged position. In the exemplary configurations, resilient member 204 pushes locking peg 202 inwardly. In other configurations, resilient member 204 pulls locking peg 202 inwardly. Resilient member 204 can be any of a variety of resilient members such as steel spring, coil spring, leaf spring, steel wire, rubber piece, plastic piece, and the like. In other configurations, locking peg 202 is forced into or out of the locking channel 203 by use of pneumatic pressure, hydraulic pressure, mechanical force, or centrifugal force (i.e.: centrifugal clutch). These can be incorporated as resilient member 204 or as devices that move peg 202 and hold peg 202 in place with a resilient force.

Locking channel 203 is designed to receive and hold locking peg 202 in the engaged position when the output shaft or collar rotate one direction. In the exemplary configuration shown in FIG. 4, the direction of electric motor output shaft 201 (or collar 301 in FIG. 8) rotation 10 is counter-clockwise which drives the drive wheel 103 through pegs 202 in the counter-clockwise direction 10. In a situation where shaft 201 stops or slows to a speed slower than drive wheel 103, locking channel 203 is designed to overpower resilient member 204 and push locking peg 202 out of the its engaged position to its disengaged position by locking peg 202 sliding on the sloped side or unlocking surface 501 or 601 of locking channel 203. Unlocking surface 501 or 601 is not parallel to locking surface 500. In the exemplary configuration shown in FIG. 5, the relative rotational direction 20 of electric motor output shaft 201 or collar 301 is clockwise which causes drive wheel 103 to disengage and rotate counter-clockwise 10 as it is being driven by the remaining motors 104 of unit 2 through its connection with driveshaft 102.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the above description and attached illustrations are an example and the invention is not limited to the exact details shown or described. Throughout the description and claims of this specification the words "comprise" and "include" as well as variations of those words, such as "comprises," "includes," "comprising," and "including" are not intended to exclude additives, components, integers, or steps.

The invention claimed is:

1. A multiple motor drive unit comprising:
a first motor having a first motor drive shaft;
a second motor having a second motor drive shaft;
an output driveshaft;
a coupler wheel device connected to the output driveshaft;
a first drive wheel coupled to the coupler wheel device;
the first drive wheel having engaged and disengaged conditions; the engaged condition locking the first drive wheel to the first motor drive shaft so that they rotate at the same speed in the same direction; the disengaged condition allowing the first drive wheel to rotate with respect to the first motor drive shaft;

a second drive wheel coupled to the coupler wheel device;

the second drive wheel having engaged and disengaged conditions; the engaged condition locking the second drive wheel to the second motor drive shaft so that they rotate at the same speed in the same direction; the disengaged condition allowing the second drive wheel to rotate with respect to the second motor drive shaft;

wherein the first motor drive shaft defines a locking channel having a lock surface; the first drive wheel including a locking peg movable between engaged and disengaged positions; the locking peg being biased toward the engaged position; a portion of the locking peg engaging the lock surface when the locking peg is in the engaged position; and the second motor drive shaft carrying a collar that defines a locking channel having a lock surface; the second drive wheel including a locking peg movable between engaged and disengaged positions; the locking peg being biased toward the engaged position; a portion of the locking peg engaging the lock surface when the peg is in the engaged position.

2. The drive unit of claim 1, wherein the first and second drive wheels include gear teeth that engage the coupler wheel device.

3. The drive unit of claim 1, wherein the first and second drive wheels frictionally engage the coupler wheel device.

4. The drive unit of claim 1, further comprising a first belt between first drive wheel and the coupler wheel device and a second belt between the second drive wheel and the coupler wheel device.

5. The drive unit of claim 1, further comprising a first chain between first drive wheel and the coupler wheel device and a second chain between the second drive wheel and the coupler wheel device.

6. The drive unit of claim 1, further comprising a belt that engages the first drive wheel, the second drive wheel, and the coupler wheel device.

7. The drive unit of claim 1, further comprising a chain that engages the first drive wheel, the second drive wheel, and the coupler wheel device.

8. The drive unit of claim 1, wherein each of the locking channels has a sloped unlocking surface that is not parallel to the lock surface.

9. The system of claim 1, further comprising an electric speed controller in communication with each drive motor.

10. The system of claim 1, further comprising a first electric speed controller in communication with the first drive motor and a second electric speed controller in communication with the second drive motor.

11. The system of claim 1, further comprising a source of electric power connected to each drive motor.

* * * * *